United States Patent
Fisk et al.

(10) Patent No.: US 12,215,117 B2
(45) Date of Patent: Feb. 4, 2025

(54) METHOD OF PREPARING ACRYLOXY-FUNCTIONAL ORGANOSILICON COMPOUNDS

(71) Applicants: Dow Silicones Corporation, Midland, MI (US); Dow Global Technologies LLC, Midland, MI (US)

(72) Inventors: Jason Fisk, Midland, MI (US); Nanguo Liu, Midland, MI (US); Muhunthan Sathiosatham, Midland, MI (US); Michael Telgenhoff, Midland, MI (US); Thu Vi, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 766 days.

(21) Appl. No.: 17/418,949

(22) PCT Filed: Dec. 27, 2019

(86) PCT No.: PCT/US2019/068727
§ 371 (c)(1),
(2) Date: Jun. 28, 2021

(87) PCT Pub. No.: WO2020/142372
PCT Pub. Date: Jul. 9, 2020

(65) Prior Publication Data
US 2022/0119420 A1    Apr. 21, 2022

Related U.S. Application Data

(60) Provisional application No. 62/786,953, filed on Dec. 31, 2018.

(51) Int. Cl.
C07F 7/08 (2006.01)
B01J 31/16 (2006.01)
C08G 77/20 (2006.01)

(52) U.S. Cl.
CPC ......... *C07F 7/0872* (2013.01); *B01J 31/1616* (2013.01); *C08G 77/20* (2013.01)

(58) Field of Classification Search
CPC .... C07F 7/0872; B01J 31/1616; C08G 77/20; C08K 5/101; C08L 83/04
See application file for complete search history.

(56) References Cited

U.S. PATENT DOCUMENTS

| | | | |
|---|---|---|---|
| 3,794,736 A | 2/1974 | Abbott et al. | |
| 4,127,872 A | 11/1978 | Shen Lo | |
| 4,242,483 A | 12/1980 | Novicky | |
| 4,365,074 A | 12/1982 | Novicky | |
| 4,644,046 A | 2/1987 | Yamada | |
| 4,657,959 A | 4/1987 | Bryan et al. | |
| 4,709,066 A | 11/1987 | Chapman | |
| 4,717,757 A | 1/1988 | Dubois et al. | |
| 4,940,766 A * | 7/1990 | Gay | C08G 77/38 556/440 |
| 5,391,600 A | 2/1995 | Umeda et al. | |
| 5,674,937 A | 10/1997 | Berg et al. | |
| 5,994,488 A | 11/1999 | Yokota et al. | |
| 6,420,504 B1 | 7/2002 | Yoshitake et al. | |
| 7,122,599 B2 | 10/2006 | Haubennestel et al. | |
| 7,317,117 B2 | 1/2008 | Nakamura et al. | |
| 10,047,199 B2 | 8/2018 | Iimura et al. | |
| 2002/0016383 A1 | 2/2002 | Iwata et al. | |
| 2003/0158435 A1 | 8/2003 | Joyce et al. | |
| 2005/0255074 A1 | 11/2005 | Hanada et al. | |

(Continued)

FOREIGN PATENT DOCUMENTS

| | | | |
|---|---|---|---|
| CN | 101321772 A | 12/2008 | |
| CN | 101356201 A | 1/2009 | |

(Continued)

OTHER PUBLICATIONS

Machine assisted English translation of JP2012121950A obtained from https://worldwide.espacenet.com/patent on Jun. 5, 2023, 16 pages.
Machine assisted English translation JP2001002732A obtained from https://patents.google.com/patent on May 2, 2022, 13 pages.
Machine assisted English translation of CN102382211A,, obtained from https://patents.google.com on Oct. 4, 2021, 8 pages . . . .
Machine assisted English translation of CN104610337, obtained from https://patents.google.com on Oct. 4, 2021, 9 pages . . . .
Machine assisted English translation of CN104910200, obtained from https://patents.google.com on Oct. 4, 2021, 8 pages . . . .

(Continued)

*Primary Examiner* — Doris L Lee
(74) *Attorney, Agent, or Firm* — Warner Norcross + Judd LLP

(57) ABSTRACT

A method of preparing an acryloxy-functional organosilicon compound is provided. The method comprises reacting (A) an initial organosilicon compound and (B) an acrylate compound in the presence of (C) a catalyst. The initial organosilicon compound (A) has one alcohol functional group (i.e., is monohydroxyl functional). The catalyst (C) has the formula $M[RC(O)CHC(O)R]_4$, where M is a group IV transition metal and each R is an independently selected substituted or unsubstituted hydrocarbyl group. An acryloxy-functional organosilicon compound prepared by the method is also provided. The acryloxy-functional organosilicon compound is prepared in increased purity, without relying on toxic catalysts.

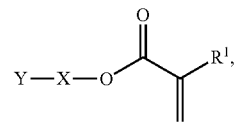

18 Claims, No Drawings

(56) References Cited

U.S. PATENT DOCUMENTS

| | | | |
|---|---|---|---|
| 2007/0142583 | A1 | 6/2007 | Schorzman et al. |
| 2007/0161810 | A1 | 7/2007 | Schorzman et al. |
| 2008/0003195 | A1 | 1/2008 | Arnaud et al. |
| 2008/0293958 | A1 | 11/2008 | Bauer et al. |
| 2010/0105938 | A1 | 4/2010 | Tonomura et al. |
| 2011/0104222 | A1 | 5/2011 | Iida et al. |
| 2012/0177402 | A1 | 7/2012 | Taniguchi et al. |
| 2012/0269747 | A1 | 10/2012 | Iimura et al. |
| 2013/0060057 | A1 | 3/2013 | Daiss et al. |
| 2015/0126676 | A1 | 5/2015 | Backer et al. |
| 2015/0216787 | A1 | 8/2015 | Hori et al. |
| 2015/0232601 | A1 | 8/2015 | Furukawa et al. |
| 2015/0252125 | A1 | 9/2015 | Moro et al. |
| 2016/0108066 | A1 | 4/2016 | Goto |
| 2017/0101423 | A1 | 4/2017 | Akabane et al. |
| 2018/0071200 | A1 | 3/2018 | Moriya |
| 2018/0078486 | A1 | 3/2018 | Kadlec et al. |
| 2018/0155482 | A1 | 6/2018 | Jaunky et al. |
| 2019/0053999 | A1 | 2/2019 | Hori et al. |
| 2019/0119502 | A1 | 4/2019 | Sakurai et al. |
| 2020/0148831 | A1 | 5/2020 | Okamura |
| 2020/0222300 | A1 | 7/2020 | Souda et al. |
| 2020/0247928 | A1 | 8/2020 | Souda et al. |
| 2020/0339757 | A1 | 10/2020 | Tanaka et al. |
| 2021/0032804 | A1 | 2/2021 | Hamajima et al. |
| 2022/0081565 | A1 | 3/2022 | Liu |
| 2022/0106337 | A1 | 4/2022 | Liu et al. |
| 2022/0112224 | A1 | 4/2022 | Jeletic et al. |
| 2022/0112338 | A1 | 4/2022 | Liu et al. |
| 2022/0119421 | A1 | 4/2022 | Liu et al. |
| 2022/0119597 | A1 | 4/2022 | Liu et al. |

FOREIGN PATENT DOCUMENTS

| | | | |
|---|---|---|---|
| CN | 102382211 A | | 3/2012 |
| CN | 104610337 A | | 5/2015 |
| CN | 104910200 A | | 9/2015 |
| CN | 105418831 A | | 3/2016 |
| CN | 107666899 A | | 2/2018 |
| DE | 4234846 A1 | | 4/1994 |
| EP | 0281718 A2 | | 9/1988 |
| EP | 0739947 A2 | | 10/1996 |
| EP | 2582453 B1 | | 12/2016 |
| EP | 3208322 B1 | | 3/2020 |
| GB | 2119951 B | | 9/1986 |
| JP | S5087184 A | | 7/1975 |
| JP | S587124 A | | 1/1983 |
| JP | S59086612 A | | 5/1984 |
| JP | S6174627 A | | 4/1986 |
| JP | S61264319 A | | 11/1986 |
| JP | S62240307 A | | 10/1987 |
| JP | S62283313 A | | 12/1987 |
| JP | H01319518 A | | 12/1989 |
| JP | H05504596 A | | 7/1993 |
| JP | H0736224 A | | 2/1995 |
| JP | H07173178 A1 | | 7/1995 |
| JP | H07196975 A | | 8/1995 |
| JP | H07309714 A | | 11/1995 |
| JP | 1995196975 A | | 8/1996 |
| JP | H08302023 A | | 11/1996 |
| JP | H09176172 A | | 7/1997 |
| JP | H1053960 A | | 2/1998 |
| JP | 2000072784 | | 3/2000 |
| JP | 2001002732 A | | 1/2001 |
| JP | 2001011186 A | | 1/2001 |
| JP | 2006109985 A | | 4/2006 |
| JP | 2007320960 A | | 12/2007 |
| JP | 2010018612 A | | 1/2010 |
| JP | 2010105941 A | | 5/2010 |
| JP | 2011016732 A | | 1/2011 |
| JP | 2011016733 A | | 1/2011 |
| JP | 2011016734 A | | 1/2011 |
| JP | 2011126807 A | | 6/2011 |
| JP | 2011126808 A | | 6/2011 |
| JP | 2011149017 A | | 8/2011 |
| JP | 2012121950 A | | 6/2012 |
| JP | 2013001672 A | | 1/2013 |
| JP | 2014034568 A | | 2/2014 |
| JP | 2014040388 A | | 3/2014 |
| JP | 2014040511 A | | 3/2014 |
| JP | 2014040512 A5 | | 3/2014 |
| JP | 2014227358 A | | 12/2014 |
| JP | 2015098451 | | 5/2015 |
| JP | 2015137252 A | | 7/2015 |
| JP | 2016008200 A | | 1/2016 |
| JP | 2016088848 A | | 5/2016 |
| JP | 2016121095 A | | 7/2016 |
| JP | 2016160191 A | | 9/2016 |
| JP | 2017071581 A | | 4/2017 |
| JP | 2017201010 A | | 11/2017 |
| JP | 2018043938 A | | 3/2018 |
| JP | 2018090495 A | | 6/2018 |
| JP | 2018097154 A | | 6/2018 |
| JP | 2018177918 A | | 11/2018 |
| JP | 2018531997 A | | 11/2018 |
| JP | 2019112540 A | | 7/2019 |
| JP | 6991236 B2 | | 2/2022 |
| JP | 2022515662 A | | 2/2022 |
| JP | 2022516107 A | | 2/2022 |
| JP | 2022516126 A | | 2/2022 |
| JP | 2022516511 A | | 2/2022 |
| JP | 2022516514 A | | 2/2022 |
| JP | 2022517913 A | | 3/2022 |
| PL | 182004 B1 | | 10/2001 |
| WO | 199200366 A1 | | 1/1992 |
| WO | 2001044861 A1 | | 6/2001 |
| WO | 2009056779 A3 | | 5/2009 |
| WO | 2009146340 A1 | | 12/2009 |
| WO | 2010026538 A1 | | 3/2010 |
| WO | 2011049246 A1 | | 4/2011 |
| WO | 2011051323 A3 | | 5/2011 |
| WO | 2011078408 A1 | | 6/2011 |
| WO | 2012143344 A1 | | 10/2012 |
| WO | 2014087183 A1 | | 6/2014 |
| WO | 2014154700 A2 | | 10/2014 |
| WO | 2014154701 A2 | | 10/2014 |
| WO | 2015092632 A2 | | 6/2015 |
| WO | 2015097103 A1 | | 7/2015 |
| WO | 2015097110 A1 | | 7/2015 |
| WO | 2016030842 A1 | | 3/2016 |
| WO | 2017037123 A1 | | 3/2017 |
| WO | 2017050699 A1 | | 3/2017 |
| WO | 2017050922 A1 | | 3/2017 |
| WO | 2017061090 A1 | | 4/2017 |
| WO | 2018086139 A1 | | 5/2018 |
| WO | WO-2018111458 A1 * | 6/2018 | .......... B01J 31/0212 |
| WO | 2018186138 A1 | | 10/2018 |
| WO | 2019003897 A1 | | 1/2019 |
| WO | 2019003898 A1 | | 1/2019 |
| WO | 2019155826 A1 | | 8/2019 |

OTHER PUBLICATIONS

Machine assisted English translation of DE4234846, obtained from https://patents.google.com on Oct. 4, 2021, 6 pages.
Machine assisted English translation of JP2011126807 obtained from https://patents.google.com on Oct. 5, 2021, 10 pages.
Machine assisted English translation of JP2011126808 obtained from https://patents.google.com on Oct. 5, 2021, 8 pages.
Machine assisted English translation of JP2014034568 obtained from https://patents.google.com on Oct. 5, 2021, 11 pages.
Machine assisted English translation of JP2014227388 obtained from https://patents.google.com on Oct. 5, 2021, 9 pages.
Machine assisted English translation of JP2014227358 obtained from https://patents.google.com on Oct. 5, 2021, 10 pages.
Machine assisted English translation of JP2015137252 obtained from https://patents.google.com on Oct. 5, 2021, 12 pages.
Machine assisted English translation of JP2016008200 obtained from https://patents.google.com on Oct. 5, 2021, 10 pages.
Machine assisted English translation of JP2016121095 obtained from https://patents.google.com on Oct. 6, 2021, 10 pages.
Machine assisted English translation of JP2016160191 obtained from https://patents.google.com on Oct. 6, 2021, 11 pages.

(56) References Cited

OTHER PUBLICATIONS

Machine assisted English translation of JP2018090495 obtained from https://patents.google.com on Oct. 6, 2021, 10 pages.
Machine assisted English translation of JPH07309714 obtained from https://patents.google.com on Oct. 6, 2021, 6 pages.
Machine assisted English translation of JP1995196975 obtained from https://patents.google.com on Oct. 6, 2021, 6 pages.
Machine assisted English translation of JP2000072784 obtained from https://patents.google.com on Oct. 6, 2021, 11 pages.
Machine assisted English translation of JP2001011186 obtained from https://patents.google.com on Oct. 6, 2021, 5 pages.
Machine assisted English translation of JP2011016732 obtained from https://patents.google.com on Oct. 6, 2021, 10 pages.
Machine assisted English translation of JP2011016733 obtained from https://patents.google.com on Oct. 6, 2021, 9 pages.
Machine assisted English translation of JP2011016734 obtained from https://patents.google.com on Oct. 6, 2021, 9 pages.
Machine assisted English translation of JP2013001672 obtained from https://patents.google.com on Oct. 6, 2021, 10 pages.
Machine assisted English translation of JP2015098451 obtained from https://patents.google.com on Oct. 7, 2021, 11 pages.
Machine assisted English translation of JP2016088848 obtained from https://patents.google.com on Oct. 7, 2021, 11 pages.
Machine assisted English translation of JPH07173178 obtained from https://patents.google.com on Oct. 7, 2021, 10 pages.
Machine assisted English translation of JPH07196975 obtained from https://patents.google.com on Oct. 7, 2021, 8 pages.
Machine assisted English translation of JPH0736224 obtained from https://patents.google.com on Oct. 7, 2021, 4 pages.
Machine assisted English translation of JPH09176172 obtained from https://patents.google.com on Oct. 7, 2021, 10 pages.
Machine assisted English translation of WO2018186138 obtained from https://patents.google.com on Oct. 7, 2021, 22 pages.
Machine assisted English translation of WO2009056779 obtained from https://patents.google.com on Oct. 7, 2021, 3 pages.
Grande, John B., The Piers-Rubinsztajn Reaction: New Routes to Structured Silicones. Diss. 201. 297 pages.
Grande, John B., et al. "Silicone Dendrons and Dendrimers From Orthogonal SiH Coupling Reactions" Polymer Chemistry, 2014, pp. 6728-6739, 5.23.
Hamid Javaherian Naghash et al., Synthesis and Characterization of a Nonionic Copolymeric Surfactant Based on a Monotelechelic Polydimethylsiloxane and Oxypropylated Acrylate Ester, Synthesis and Reactivity in Inorganic, Metal-organic, Nano-metal Chemistry, Apr. 21, 2014, pp. 514-522, Vo;. 44, No. 4.

David Mancardi et al., "Convenient Synthesis of Tributylsilyl Methacrylate," Synthetic Communications, Oct. 1, 2007, pp. 3873-3878, vol. 37, No. 21.
Sangkyu Lee et al., "Refractive Index Engineering of Transparent $ZrO_2$-polydimethylsiloxane Nanocompositves," Journal of Materials Chemistry, Jan. 2018, p. 1751-1755, vol. 18, No. 15.
International Search Report for International Application No. PCT/US2019/068727, Mar. 17, 2020, five pages.
Machine assisted English translation of JPH0319518A obtained from https://patents.google.com on Oct. 7, 2021, 9 pages.
Machine assisted English translation of JP2006109985A obtained from https://worldwide.espacenet.com/patent on Nov. 6, 2023, 18 pages.
Machine assisted English translation of JPS587124A obtained from https://worldwide.espacenet.com/patent on Nov. 6, 2023, 7 pages.
Machine assisted English translation of JPS6174627A obtained from https://worldwide.espacenet.com/patent on Apr. 15, 2024, 17 pages.
Machine assisted English translation of JP2018097154A obtained from https://worldwide.espacenet.com/patent on Apr. 15, 2024, 21 pages.
ACS Symposium Series, 2013, 59-78, Progress in Silicones and Silicone-Modified Materials, ISSN: 0097-6156.
Synthesis and Reactivity in Inorganic, Metal-Organic, and Nano-Metal Chemistry, 2014, 44, 514-522.
Machine assisted English translation of JPS5986612A obtained from https://worldwide.espacenet.com/patent on Apr. 18, 2024, 5 pages.
D. J. Keddie, et al. 13 Organic Letters 6006-6009 (2011) (Year: 2011).
Machine assisted English translation of JPS5087184A obtained from https://worldwide.espacenet.com/patent on Feb. 26, 2024, 6 pages.
Machine assisted English translation of JPS61264319A obtained from https://worldwide.espacenet.com/patent on Feb. 26, 2024, 5 pages.
Machine assisted English translation of JPH1053960A obtained from <https://patents.google.com/patent> on Oct. 29, 2024, 6 pages.
Machine assisted English translation of JP2019112540A obtained from <https://patents.google.com/patent> on Nov. 14, 2024, 17 pages.
Machine assisted English translation of CN105418831A obtained from https://patents.google.com/patent on Nov. 14, 2024, 10 pages.
Machine assisted English translation of PL182004B1 obtained from https://patents.google.com/patent on Nov. 4, 2024, 10 pages.

* cited by examiner

METHOD OF PREPARING ACRYLOXY-FUNCTIONAL ORGANOSILICON COMPOUNDS

CROSS-REFERENCE TO RELATED APPLICATIONS

This application is the National Stage of International Appl. No. PCT/US2019/068727 filed on 27 Dec. 2019, which claims priority to and all advantages of U.S. Provisional Patent Application No. 62/786,953 filed on 31 Dec. 2018, the content of which is incorporated herein by reference.

FIELD OF THE INVENTION

The present invention generally relates to organosilicon compounds and, more specifically, to a method of preparing acryloxy-functional organosilicon compounds and acryloxy-functional organosilicon compounds prepared thereby.

DESCRIPTION OF THE RELATED ART

Organosilicon materials are known in the art and are utilized in myriad end use applications and environments. For example, organopolysiloxanes thereby prepared are utilized in numerous industrial, home care, and personal care formulations. Increasingly, hybrid materials having both silicone and organic functionality are utilized in such formulations, as such hybrid materials may exhibit combined benefits traditionally associated with only silicone materials or organic materials. However, many methods of preparing hybrid materials require functional organosilicon compounds, which are often difficult to synthesize and/or utilize. In particular, traditional methods of preparing certain functional organosilicon compounds rely on catalysts that have toxicity issues that are not easily managed in production. Unfortunately, conventional attempts to minimize or circumvent use of such toxic catalysts are often incompatible with many silicone materials (e.g. via promoting silicone rearrangements, unselective reactions, degradation, hydrolysis of functional groups, etc.), resulting in decreased yields and purities, and limiting general applicability of such approaches.

BRIEF SUMMARY OF THE INVENTION

A method of preparing an acryloxy-functional organosilicon compound is provided. The method comprises reacting (A) an initial organosilicon compound and (B) an acrylate compound in the presence of (C) a catalyst. The initial organosilicon compound (A) has one alcohol functional group. The catalyst (C) has the formula M[RC(O)CHC(O)R]$_4$, where M is a group IV transition metal and each R is an independently selected substituted or unsubstituted hydrocarbyl group.

An acryloxy-functional organosilicon compound prepared by the method is also provided.

DETAILED DESCRIPTION OF THE INVENTION

A method of preparing an acryloxy-functional organosilicon compound is disclosed.

The acryloxy-functional organosilicon compound prepared may be utilized in diverse end use applications. For example, the acryloxy-functional organosilicon compound may be utilized as a starting component when preparing silicone-organic hybrid materials, e.g. via copolymerization, grafting, etc.

The method comprises reacting (A) an initial organosilicon compound and (B) an acrylate compound in the presence of (C) a catalyst. Reacting the initial organosilicon compound (A) and the acrylate compound (B) generally comprises combining the initial organosilicon compound (A) and the acrylate compound (B) in the presence of the catalyst (C). Said differently, there is generally no proactive step required for the reaction beyond combining the initial organosilicon compound (A) and the acrylate compound (B) in the presence of the catalyst (C). As will be appreciated by those of skill in the art, the reaction may be defined or otherwise characterized as a transesterification reaction.

The initial organosilicon compound (A) is an organosilicon compound having one alcohol group (i.e., is monohydroxyl functional), and is otherwise not particularly limited.

In some embodiments, the initial organosilicon compound (A) has the following formula (I):

where X is a divalent linking group; and each R$^3$ is independently selected from hydrocarbyl groups and siloxy groups.

In general, X is a divalent linking group, and may be linear or branched and substituted or unsubstituted. When branched, X may optionally be bonded (e.g. cross-linked) to a siloxane segment or a silane moiety (i.e., other than the silane moiety represented by the subformula R$^3{}_3$Si— in the general organosilicon compound formula above. Typically, X is selected from divalent substituted or unsubstituted hydrocarbon groups, which may optionally be modified or substituted, e.g. with alkoxy, siloxy, silyl, amino, amido, acetoxy, and aminoxy groups. For example, in some embodiments, X comprises a hydrocarbon moiety having the formula —(CH$_2$)$_n$—, where subscript n is from 1 to 16. In these or other embodiments, X may comprise a substituted hydrocarbon, i.e., a hydrocarbon group comprising a backbone having at least one heteroatom (e.g. O, N, S, etc.). For example, in some embodiments, X is a hydrocarbon having a backbone comprising an ether moiety, an amino moiety, or both.

Each R$^3$ is independently selected from hydrocarbyl groups and siloxy groups. However, as will be appreciated from the description herein, each R$^3$ may comprise a combination of such hydrocarbyl groups and siloxy groups. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R$^3$ includes one or more heteroatoms (oxygen, sulfur, nitrogen, etc.) within the chain, or both. As such, it will be appreciated that R$^3$ includes hydrocarbon moieties that may have substituents in and/or on (i.e., appended to and/or integral with) carbon chains/backbones thereof, such that R$^3$ may comprise or be an ether, an amine, etc.

In general, hydrocarbyl groups suitable for $R^3$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g., isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups Examples of suitable siloxy groups include [M], [D], [T], and [Q] units, which, as understood in the art, each represent structural units of individual functionality present in organopolysiloxanes. More specifically, [M] represents the monofunctional unit of general formula $R^3{}_3SiO_{1/2}$; [D] represents the difunctional unit of general formula $R^3{}_2SiO_{2/2}$; [T] represents the trifunctional unit of general formula $R^3SiO_{3/2}$; and [Q] represents the tetrafunctional unit of general formula $SiO_{4/2}$, as shown by the general formulas of the siloxy groups below:

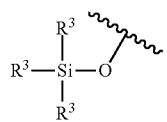

[M]

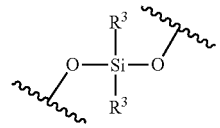

[D]

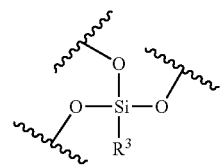

[T]

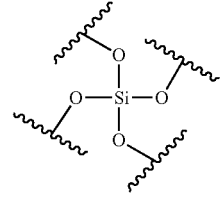

[Q]

In these general structural moieties, each $R^3$ is independently a monovalent or polyvalent substituent. As understood in the art, specific substituents suitable for each $R^3$ are not limited, and may be monoatomic or polyatomic, organic or inorganic, linear or branched, substituted or unsubstituted, aromatic, aliphatic, saturated or unsaturated, and combinations thereof.

Typically, each $R^3$ is independently selected from hydrocarbyl groups and siloxy groups. The hydrocarbyl group(s) represented by $R^3$, when present, may be substituted or unsubstituted, and may be aliphatic, aromatic, cyclic, alicyclic, etc., as described above with respect to the examples of hydrocarbyl groups suitable for $R^2$, which are equally exemplary of those suitable for use with respect to $R^3$. The siloxy group(s) represented by $R^3$, when present, may be substituted or unsubstituted, and may comprise, alternatively may be, any combination of [M], [D], [T], and [Q] units (i.e., the silane moiety may comprise a branched and/or dendrimeric siloxane).

In some embodiments, the initial organosilicon compound (A) has the following formula (II):

$$[R^3{}_3SiO_{1/2}]_a[R^3{}_2SiO_{2/2}]_b[R^3SiO_{3/2}]_c[SiO_{4/2}]_d \qquad (II),$$

where each $R^3$ is independently selected from substituted or unsubstituted hydrocarbyl groups and linear or branched siloxy groups, with the proviso that one $R^3$ comprises an alcohol group; and subscripts a, b, c, and d are each mole fractions such that a+b+c+d=1, with the proviso that a+b+c>0. In such embodiments, the $R^3$ comprising the alcohol group typically has the formula —X—OH, where X is the divalent linking group described above.

It will be appreciated by those of skill in the art that the siloxy moieties indicated by subscripts a, b, c, and d correspond to [M], [D], [T], and [Q] siloxy units, respectively, as introduced and described above. In some embodiments, the initial organosilicon compound (A) comprises repeating [D] units, i.e., where subscript b>0. In these embodiments, subscript b is typically a value of from 0.3 to 1 (e.g. 0.3≤b≤1), such as from 0.3 to 0.9999, alternatively from 0.3 to 0.999, alternatively from 0.3 to 0.99, alternatively from 0.3 to 0.9, alternatively from 0.5 to 0.999, alternatively from 0.6 to 0.999, alternatively from 0.7 to 0.99, alternatively from 0.8 to 0.99, alternatively from 0.85 to 0.99, alternatively from 0.9 to 0.99. Subscript a is typically a value of from 0 to 0.1 (0≤a≤0.1), such as from 0 to 0.099, alternatively from 0 to 0.09, alternatively from 0 to 0.085, alternatively from 0 to 0.08, alternatively from 0 to 0.075, alternatively from 0 to 0.07, alternatively from 0 to 0.065, alternatively from 0 to 0.06, alternatively from 0 to 0.055, alternatively from 0 to 0.05, alternatively from 0.001 to 0.05, alternatively from 0.002 to 0.05, alternatively from 0.005 to 0.01. Subscripts c and d are typically each an independently selected value of from 0 to 0.1 (e.g. $0 \le c \le 0.1$ and $0 \le d \le 0.1$), such as from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001. In certain embodiments, the initial organosilicon compound (A) comprises a linear siloxane segment, where subscript b is from 0.9 to 1, subscript a is from 0 to 0.1, and subscripts c and d are each 0. When the initial organosilicon compound (A) comprises repeating [D] units, the number of specific [D] units (i.e., the degree of polymerization, DP) in any one siloxane segment is not limited. Typically, such siloxane segments comprise from 1 to 700 repeating [D] units, such as from 2 to 600, alternatively from 2 to 500, alternatively from 5 to 400, alternatively from 5 to 300, alternatively from 10 to 250, alternatively from 10 to 200, alternatively from 15 to 150, alternatively from 15 to 100, alternatively from 15 to 50 repeating [D] units.

With respect to both formulas of the initial organosilicon compound (A) described above (i.e., when initial organosilicon compound (A) is of formula (I) or (II)), the presence and proportion of [M], [D], [T], and [Q] units is independently selected, as is the particular substituent for each $R^3$ of each silyl substituent of a silane moiety (e.g. when the initial organosilicon compound (A) is of formula (I)) as well as for each $R^3$ of any particular siloxy unit (e.g. those indicated by subscripts a, b, and c with respect to formula (II) above). For example, a proportion of [T] and [Q] units of or around 0 is typically selected to increase the linearity of the initial organosilicon compound (A), such as when the initial organosilicon compound (A) is a linear organopolysiloxane. Such organopolysiloxanes are typically linear or substantially linear, but may include some branching attributable to [T] and/or [Q] units (e.g. where c+d>0). Conversely, the proportion of [T] and/or [Q] units is selected to be greater than 0 when the initial organosilicon compound (A) is an organopolysiloxane resin. Accordingly, one of skill in the art will select the composition of the siloxane segments to control the composition of the initial organosilicon compound (A), and thus the acryloxy-functional organosilicon compound, e.g. based on a desired property of a particular initial organosilicon compound (A), a desired/intended property and/or characteristic (e.g. physical, chemical, aesthetic, etc.) of the acryloxy-functional organosilicon compound or a compound prepared therewith, etc. For example, it may be desirable for the acryloxy-functional organosilicon compound or a compound prepared therewith to have a high melting temperature and/or softening point, or for a formulation prepared therewith to be in a specific form (e.g. the form of a solid, gel, etc.), and selecting the composition of the initial organosilicon compound (A) may allow one of skill in the art to achieve a range of such desirable properties. In general, linear siloxane segments are utilized in organopolysiloxanes to form layers or coatings with improved feel (e.g. comfortable deposit) and flexibility as compared to those using organopolysiloxanes including increased branching attributable to [T] and/or [Q] units. Likewise, resinous organopolysiloxanes are used to form products with increased hardness, transfer resistance, etc., as compared to those where more linear organopolysiloxanes are utilized.

In certain embodiments, the method comprises utilizing more than one initial organosilicon compound (A), such as 2, 3, 4, or more initial organosilicon compounds (A). In such embodiments, each initial organosilicon compound (A) is independently selected, and may be the same or different from any other initial organosilicon compound (A).

The initial organosilicon compound (A) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, an aqueous solvent (e.g. water), or combinations thereof. In certain embodiments, the initial organosilicon compound (A) is free from, alternatively substantially free from carrier vehicles. In some such embodiments, the initial organosilicon compound (A) is free from, alternatively substantially free from, water and carrier vehicles/volatiles reactive with the acrylate compound (B) and/or the catalyst (C). For example, in certain embodiments, the method may comprise stripping the initial organosilicon compound (A) of volatiles and/or solvents (e.g. organic solvents, water, etc.). Techniques for stripping the initial organosilicon compound (A) are known in the art, and may include distillation, heating, applying reduced pressure/vacuum, azeotroping with solvents, utilizing molecular sieves, etc., and combinations thereof.

The acrylate compound (B) is typically an acrylate ester, although other acrylates may also be utilized (e.g. acrylic anhydrides). Typically the acrylate compound (B) has the following formula:

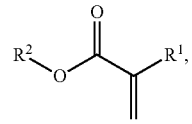

where $R^1$ is selected from substituted or unsubstituted hydrocarbyl groups and H; and $R^2$ is a substituted or unsubstituted hydrocarbyl group having from 1 to 4 carbon atoms. As will be understood by one of skill in the art, $R^2$ is generally an alkyl group (i.e., such that the acrylate compound (B) may be defined as an alkyl acrylate ester), and is selected from methyl, ethyl, propyl groups (n-propyl, iso-propyl), and butyl groups (e.g. n-butyl, sec-butyl, iso-butyl, t-butyl). Typically, $R^2$ is methyl, ethyl, n-propyl, or n-butyl.

In certain embodiments, $R^1$ is H, such that the acrylate compound (B) may be defined as an alkyl acrylic ester. In other embodiments, $R^1$ is selected from substituted or unsubstituted hydrocarbyl groups, such as any of those described above with respect to $R^3$. In some such embodiments, $R^1$ is an alkyl group, such that the acrylate compound (B) may be defined as an alkyl alkylacrylic ester. In specific embodiments, $R^1$ is methyl, such that the acrylate compound (B) may be defined as an alkyl methacrylic ester.

Specific examples of compounds suitable for use as the acrylate compound (B) generally include methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, and tert-butyl (meth)acrylate, methyl acrylate, ethyl acrylate, n-propyl acrylate, iso-propyl acrylate, n-butyl acrylate, iso-butyl acrylate, sec-butyl acrylate, and tert-butyl acrylate. In certain embodiments, the acrylate compound (B) is selected from methyl (meth)acrylate, ethyl (meth)acrylate, and n-butyl (meth)acrylate. In some embodiments, the acrylate compound (B) is selected from methyl acrylate, ethyl acrylate, and n-butyl acrylate.

In certain embodiments, the method comprises utilizing more than one acrylate compound (B), such as 2, 3, 4, or more acrylate compounds (B). In such embodiments, each acrylate compound (B) is independently selected, and may be the same or different from any other acrylate compound (B).

The acrylate compound (B) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc., alcohols such as methanol, ethanol, etc.;), a silicone fluid, an aqueous solvent (e.g. water), or combinations thereof. In certain embodiments, the acrylate compound (B) is free from, alternatively substantially free from carrier vehicles. In some such embodiments, the acrylate compound (B) is free from, alternatively substantially free from, water and carrier vehicles/volatiles reactive with the initial organosilicon compound (A) and/or the catalyst (C). For example, in certain embodiments, the method may comprise stripping the acrylate compound (B) of volatiles and/or solvents (e.g. water, organic solvents such as alcohols, ethers, etc.). Techniques for stripping the acrylate compound (B) are known in the art, and may include distillation, heating, applying reduced pressure/vacuum, azeotroping with solvents, utilizing molecular sieves, etc., and combinations thereof.

The relative amounts of the initial organosilicon compound (A) and the acrylate compound (B) utilized may vary, e.g. based upon the particular organosilicon compound (A) selected, the particular the acrylate compound (B) selected, the reaction parameters employed, etc. As understood by those of skill in the art, the transesterification of the acrylate compound (B) with the alcohol of the initial organosilicon compound (A) occurs at a theoretical maximum molar ratio of 1:1 (A):(B). However, an excess of the one of the components is typically utilized to fully consume one of compounds (A) or (B), e.g. to simplify purification of the reaction product formed. For example, in certain embodiments, compound (B) is utilized in relative excess to maximize a conversion rate of the initial organosilicon compound (A) to the acryloxy-functional organosilicon compound.

In certain embodiments, the initial organosilicon compound (A) and the acrylate compound (B) are reacted in a molar ratio of from 0.1 to 20 (A):(B). For example, in certain embodiments, the initial organosilicon compound (A) and the acrylate compound (B) are reacted in a molar ratio of from 1:1 to 1:10, such as from 1:1.1 to 1:10, alternatively of from 1:1.5 to 1:10, alternatively of from 1:2 to 1:10, alternatively of from 1:2.5 to 1:10, alternatively of from 1:3 to 1:10, alternatively of from 1:4 to 1:10, alternatively of from 1:5 to 1:10, alternatively of from 1:6 to 1:10, (A):(B). In some embodiments, the initial organosilicon compound (A) and the acrylate compound (B) are reacted in a molar ratio of from 1:1 to 20:1, such as from 1.1:1 to 20:1, alternatively of from 1.5:1 to 20:1, alternatively of from 2:1 to 20:1, alternatively of from 2.5:1 to 20:1, alternatively of from 3:1 to 20:1, alternatively of from 4:1 to 20:1, alternatively of from 5:1 to 20:1, alternatively of from 10:1 to 20:1, alternatively of from 15:1 to 20:1, (A):(B). It will be appreciated that ratios outside of these ranges may be utilized as well. For example, in certain embodiments, the acrylate compound (B) is utilized in a gross excess (e.g. in an amount of ≥10, alternatively ≥15, alternatively ≥20, times the molar amount of the initial organosilicon compound (A)), such as when the acrylate compound (B) is utilized as a carrier (i.e., a solvent, diluent, etc.) during the reaction.

The catalyst (C) has the formula $M[RC(O)CHC(O)R]_4$, where M is a group IV transition metal and each R is an independently selected substituted or unsubstituted hydrocarbyl group.

Group IV transition metals include titanium (Ti), zirconium (Zr), hafnium (Hf) and rutherfordium (Rf). Typically, M is selected from zirconium and hafnium. For example, in some embodiments, the catalyst (C) has the formula $Zr[RC(O)CHC(O)R]_4$. In other embodiments, the catalyst (C) has the formula $Hf[RC(O)CHC(O)R]_4$.

Each R is an independently selected substituted or unsubstituted hydrocarbyl group, such as any of those described above with respect to $R^3$. As such, each beta-diketone of formula RC(O)CHC(O)R may be the same or different from any other beta-diketone in the catalyst (C). Typically, however, each beta-diketone is the same in the catalyst (C). Each R may be the same or difference from any other R in the catalyst (C) (i.e., the groups R of a particular beta-diketone may be the same or different, and the groups R of a particular beta-diketone may be the same or different than those of another particular beta-diketone in the catalyst (C). Specific examples of such hydrocarbyl groups for R include methyl, ethyl, trifluoromethyl, 4-methoxyphenyl, 4-chlorophenyl, tert-butyl, 2-pyridyl, heptafluoropropyl, iso-butyl, 2-mesetylenyl, phenyl, benzyl, 2-thienyl, and 2-napthyl groups. Typically, each R is independently selected from methyl and ethyl groups. In certain embodiments, each R is methyl, such the beta-diketones of the catalyst (C) are each are each anions of pentane-2,4-dione and may thus be defined as an acetylacetone (AcAc) ligand. While described conventionally in terms of the diketone (i.e., dione"), one of skill in the art will readily understand that the anionic ligands represented by the formula RC(O)CHC(O)R will typically be characterized as an enolate (e.g. a beta-ketoenolate) of the parent diketone.

In specific embodiments, the catalyst (C) is $Zr(AcAc)_4$ and/or $Hf(AcAc)_4$.

In certain embodiments, the method comprises utilizing more than one catalyst (C), such as 2 different catalysts (C). In such embodiments, each catalyst (C) is independently selected, and may be the same or different from any other catalyst (C) being utilized. For example, in some embodiments, the catalyst (C) is a combination of $Zr(AcAc)_4$ and $Hf(AcAc)_4$ (i.e., is a mixed-salt catalyst).

Methods of preparing compounds suitable for use in, or as, catalyst (C) are well known in the art, and many of the compounds listed herein are commercially available from various suppliers. As such, the catalyst (C) may be prepared as part of the method, or otherwise obtained (i.e., as a prepared compound). Preparations of the catalyst (C) (e.g. by mixing an appropriate beta-diketone salt with a Zr and/or Hf inorganic salt) may be formed prior to the reaction of components (A) and (B), or in situ (i.e., during the reaction of components (A) and (B)).

The catalyst (C) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof. In certain embodiments, the catalyst (C) is free from, alternatively substantially free from carrier vehicles. In some such embodiments, the catalyst (C) is free from, alternatively substantially free from, water and carrier vehicles/volatiles reactive with the initial organosilicon compound (A), the acrylate compound (B), and/or the catalyst (C) itself. For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof.

The catalyst (C) may be utilized in any amount, which will be selected by one of skill in the art, e.g. dependent upon the particular catalyst (C) selected, the reaction parameters employed, the scale of the reaction (e.g. total amounts of components (A) and (B)), etc. The molar ratio of the catalyst (C) to components (A) and/or (B) utilized in the reaction may influence the rate and/or amount of transesterification to prepare the acryloxy-functional organosilicon compound. Thus, the amount of the catalyst (C) as compared to components (A) and/or (B), as well as the molar ratios therebetween, may vary. Typically, these relative amounts and the molar ratio are selected to maximize the conversion rate components (A) and (B) to the acryloxy-functional organosilicon compound, while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.01 to 10 mol % based on the total amounts of components (A) and/or (B) utilized. For example, the catalyst (C) may be used in an amount of from 0.01 to 8, alternatively of from 0.01 to 6, alternatively of from 0.05 to 5 mol % based on the total amounts of components (A) and/or (B) utilized. In specific embodiments, the catalyst (C) is utilized in the reaction in an amount of from 0.05 to 10 mol % based on the amount of initial organosilicon compound (A) being reacted. For examples, in such embodiments, components (A) and (C) may be utilized in a molar ratio of up to 2000:1, alternatively of up to 1000:1, alternatively of up to 500:1, alternatively of up to 500:1, alternatively of up to 200:1, alternatively of up to 100:1, alternatively of up to 50:1, alternatively of up to 20:1, alternatively of up to 5:1.

In certain embodiments, the initial organosilicon compound (A) and the acrylate compound (B) are reacted in the presence of (D) a polymerization inhibitor. The polymerization inhibitor is not limited, and may comprise, alternatively may be, a radical scavenger, an antioxidant, a light stabilizer, a UV-absorber, or the like, or a combination thereof. Such compounds are known in the art, and generally are, or include, a chemical compound or moiety capable of interacting with a free radical to render the free radical inactive, e.g. via elimination the free radical through the formation of a covalent bond therewith. The polymerization inhibitor (D) may also, or alternatively, be a polymerization retardant, i.e., a compound that reduces the rate of initiation and/or propagation of a radical polymerization. For example, in some embodiments, the polymerization inhibitor (D) comprises, alternatively is, oxygen gas. In general, the polymerization inhibitor (D) is utilized to prevent and/or suppress the formation of byproducts that may be formed via radical polymerization of the acrylate compound (B) and/or the acryloxy-functional organosilicon compound.

The polymerization inhibitor (D) is not limited, and may comprise, alternatively may be, a phenolic compound, a quinone or hydroquinone compound, an N-oxyl compound, a phenothiazine compound, a hindered amine compound, or a combination thereof.

Examples of phenolic compounds include phenol, alkylphenols, aminophenols (e.g. p-aminophenol), nitrosophenols, and alkoxyphenols. Specific examples of such phenol compounds include o-, m- and p-cresol(methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol or 2,2'-methylenebis(6-tert-butyl-4-methylphenol), 4,4'-oxybiphenyl, 3,4-methylenedioxydiphenol (sesamol), 3,4-dimethylphenol, pyrocatechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6-tris-tert-butylphenol, 2,6-di-tert-butylphenol, nonylphenol, octylphenol, 2,6-dimethylphenol, bisphenol A, bisphenol B, bisphenol C, bisphenol F, bisphenol S, 3,3',5,5'-tetrabromobisphenol A, 2,6-di-tert-butyl-p-cresol, methyl 3,5-di-tert-butyl-4-hydroxybenzoate, 4-tert-butylpyrocatechol, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyl β-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris-(3,5-di-tert-butyl-4-hydroxybenzyl)benzene, 1,3,5,-tris(3,5-di-tert-butyl-4-hydroxybenzyl)isocyanurate, 1,3,5-tris(3,5-di-tert-butyl-4-hydroxyphenyl)propionyloxyethyl isocyanurate, 1,3,5-tris(2,6-dimethyl-3-hydroxy-4-tert-butylbenzyl)isocyanurate or pentaerythrityl tetrakis[p-(3,5-di-tert-butyl-4-hydroxyphenyl)propionate], 2,6-di-tert-butyl-4-dimethylaminomethylphenol, 6-sec-butyl-2,4-dinitrophenol, octadecyl 3-(3',5'-di-tert-butyl-4'-hydroxyphenyl)propionate, hexadecyl 3-(3',5'-di-tert-butyl-4'-hydroxyphenyl)propionate, octyl 3-(3',5'-di-tert-butyl-4'-hydroxyphenyl)propionate, 3-thia-1,5-pentanediol bis[(3',5'-di-tert-butyl-4'-hydroxyphenyl)propionate], 4,8-dioxa-1,11-undecanediol bis[(3',5'-di-tert-butyl-4'-hydroxyphenyl)propionate], 4,8-dioxa-1,11-undecanediol bis[(3'-tert-butyl-4'-hydroxy-5'-methylphenyl)propionate], 1,9-nonanediol bis[(3',5'-di-tert-butyl-4'-hydroxyphenyl)propionate], 1,7-heptanediaminebis[3-(3',5'-di-tert-butyl-4'-hydroxyphenyl)propionamide], 1,1-methanediaminebis[3-(3',5'-di-tert-butyl-4'-hydroxyphenyl) propionamide], 3-(3',5'-di-tert-butyl-4'-hydroxyphenyl) propionic acid hydrazide, 3-(3',5'-dimethyl-4'-hydroxyphenyl)propionic acid hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyclohex-1'-yl)-5-methyl-2-hydroxyphen-1-yl]methane, bis(3-tert-butyl-2-hydroxy-5-methylphen-1-yl)methane, 1,1-bis(5-tert-butyl-4-hydroxy-2-methylphen-1-yl)ethane, bis(5-tert-butyl-4-hydroxy-2-methylphen-1-yl) sulfide, bis(3-tert-butyl-2-hydroxy-5-methylphen-1-yl) sulfide, 1,1-bis(3,4-dimethyl-2-hydroxyphen-1-yl)-2-methylpropane, 1,1-bis(5-tert-butyl-3-methyl-2-hydroxyphen-1-yl)butane, 1,3,5-tris-[1'-(3,8,5"-di-tert-butyl-4"-hydroxyphen-1"-yl)meth-1'-yl]-2,4,6-trimethylbenzene, 1,1,4-tris(5'-tert-butyl-4'-hydroxy-2'-methylphen-1'-yl)butane and tert-butyleatechol, p-nitrosophenol, p-nitroso-o-cresol, methoxyphenol (guajacol, pyrocatechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol, isoeugenol, tocopherols, such as α-, β-, γ-, δ- and ε-tocopherol, tocol, α-tocopherolhydroquinone, 2,3-dihydro-2,2-dimethyl-7-hydroxybenzofuran (2,2-dimethyl-7-hydroxycoumaran), and the like.

Suitable quinones and hydroquinones include hydroquinone, hydroquinone monomethyl ether(4-methoxyphenol), methylhydroquinone, 2,5-di-tert-butylhydroquinone, 2-methyl-p-hydroquinone, 2,3-dimethylhydroquinone, trimethylhydroquinone, 4-methylpyrocatechol, tert-butylhydroquinone, 3-methylpyrocatechol, benzoquinone, 2-methyl-p-hydroquinone, 2,3-dimethylhydroquinone, tdmethylhydroquinone, tert-butylhydroquinone, 4-ethoxyphenol, 4-butoxyphenol, hydroquinone monobenzyl ether, p-phenoxyphenol, 2-methylhydroquinone, tetramethyl-p-benzoquinone, diethyl-1,4-cyclohexanedion 2,5-dicarboxylate, phenyl-p-benzoquinone, 2,5-dimethyl-3-benzyl-p-benzoquinone, 2-isopropyl-5-methyl-p-benzoquinone (thymoquinone), 2,6-diisopropyl-p-benzoquinone, 2,5-dimethyl-3-hydroxy-p-benzoquinone, 2,5-dihydroxy-p-benzoquinone, embelin, tetrahydroxy-p-benzoquinone, 2,5-dimethoxy-1,4-benzoquinone, 2-amino-5-methyl-p-benzoquinone, 2,5-bisphenylamino-1,4-benzoquinone, 5,8-dihydroxy-1,4-naphthoquinone, 2-anilino-1,4-naphthoquinone, anthraquinone, N,N-dimethylindoaniline, N,N-diphenyl-p-benzoquinonediimine, 1,4-benzoquinone dioxime, coerulignone, 3,3'-di-tert-butyl-5,5'-dimethyldiphenoquinone, p-rosolic acid (aurin), 2,6-di-tert-butyl-4-benzylidenebenzoquinone, 2,5-di-tert-amylhydroquinone, and the like.

Suitable N-oxyl compounds (i.e., nitroxyl or N-oxyl radicals) include compounds which have at least one N—O· group, such as 4-hydroxy-2,2,6,6-tetramethylpiperidin-N-oxyl, 4-oxo-2,2,6,6-tetramethylpiperidin-N-oxyl, 4-methoxy-2,2,6,6-tetramethylpiperidin-N-oxyl, 4-acetoxy-2,2,6,6-tetramethylpiperidin-N-oxyl, 2,2,6,6-tetramethylpiperidin-N-oxyl (TEMPO), 4,4',4''-tris(2,2,6,6-tetramethylpiperidin-N-oxyl)phosphite, 3-oxo-2,2,5,5-tetramethylpyrrolidin-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl 2-ethylhexanoate, 1-oxyl-2,2,6,6-tetramethylpiperidin-4-yl sebacate, 1-oxyl-2,2,6,6-tetramethylpiperidin-4-yl stearate, 1-oxyl-2,2,6,6-tetramethylpiperidin-4-yl-benzoate, 1-oxyl-2,2,6,6-tetramethylpiperidin-4-yl (4-tert-butyl)benzoate, bis(1-oxyl-2,2,6,6-tetramethylpiperidin4-yl) succinate, bis(1-oxyl-2,2,6,6-tetramethylpiperidin-4-yl) adipate, bis(1-oxyl-2,2,6,6-tetramethylpiperidin-4-yl)1,10-decanedioate, bis(1-oxyl-2,2,6,6-tetramethylpiperidin4-yl)n-butylmalonate, bis(1-oxyl-2,2,6,6-tetramethylpiperidin-4-yl) phthalate, bis(1-oxyl-2,2,6,6-tetramethylpiperidin-4-yl)isophthalate, bis(1-oxyl-2,2,6,6-tetramethylpiperidin4-yl) terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris[N-butyl-N-(1-oxyl-2,2,6,6-tetramethylpiperidin-4-yl]triazine, N,N'-bis(1-oxyl-2,2,6,6-tetramethylpiperidin-4-yl)-N,N'-bisformyl-1,6-diaminohexane, 4,4'-ethylenebis(1-oxyl-2,2,6,6-tetramethylpiperazin-3-one), and the like.

Other compounds suitable for use in or as the polymerization inhibitor (D) include phenothiazine (PTZ) and compounds with similar structures, such as phenoxazine, promazine, N,N'-dimethylphenazine, carbazole, N-ethylcarbazole, N-benzylphenothiazine, N-(1-phenylethyl)phenothiazine, N-Alkylated phenothiazine derivatives such as N-benzylphenothiazine and N-(1-phenylethyl)phenothiazine, and the like. Of course, the polymerization inhibitor (D) may include any number of particular compounds, which may each be independently selected and the same as or different from any other compound of the polymerization inhibitor (D).

When utilized, the polymerization inhibitor (D) may be added to the reaction as a discrete component, or may be combined with another component (e.g. the acrylate compound (B)) prior to the reaction of components (A) and (B). The polymerization inhibitor (D) may be utilized in any amount, which will be selected by one of skill in the art, e.g. dependent upon the particular polymerization inhibitor (D) selected, the reaction parameters employed, the scale of the reaction (e.g. total amounts of components (A) and/or (B)), the atmosphere of the reaction, the temperature and/or pressure of the reaction, etc.). In certain embodiments, the polymerization inhibitor (D) is present in the reaction in an amount of from 50 to 2000 ppm, such as in an amount of 50, alternatively of 100, alternatively of 250, alternatively of 500, alternatively of 1000, alternatively of 1500, alternatively of 2000, ppm. However, one of skill in the art will readily appreciate that amounts outside of these ranges and exemplary amounts may also be utilized, e.g. where the reaction scale and/or conditions requires additional amounts of the polymerization inhibitor (D). Moreover, in addition or as an alternative to the above amounts, oxygen may be added to the reaction as a separate component (e.g. in place of, or in addition to, a discrete polymerization inhibitor (D) selected from the compounds above). In such instances, the oxygen may be introduced into the reaction in the form of oxygen gas, optionally in the presence of other gasses (e.g. in the form of air). When utilized, the amount of oxygen gas is selected such that the gas phase above the reaction mixture remains below the explosion limit.

Typically, the reaction of components (A) and (B) to prepare the acryloxy-functional organosilicon compound is carried out in a vessel or reactor. When the reaction is carried out at an elevated temperature, as described below, the vessel or reactor may be heated in any suitable manner, e.g. via a jacket, heating mantle, hotplate, coils, etc.

Components (A), (B), and (C), and optionally (D), may be fed together or separately to the vessel, or may be disposed in the vessel in any order of addition, and in any combination. For example, in certain embodiments, components (B) and (C) are added to a vessel containing component (A), and optionally component (D). In such embodiments, components (B) and (C) may be first combined prior to the addition, or may be added to the vessel sequentially. In general, reference to the "reaction mixture" herein refers generally to a mixture comprising components (A), (B), and (C) (e.g. as obtained by combining such components, as described above).

The method may further comprise agitating the reaction mixture. The agitating may enhance mixing and contacting together components (A), (B), and (C) when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., transesterification), of the acrylate compound (B) with the initial organosilicon compound (A) so as to form the acryloxy-functional organosilicon compound. Other conditions may be result-effective conditions for enhancing reaction yield or minimizing amount of a particular reaction byproduct included within the reaction product along with the acryloxy-functional organosilicon compound.

In certain embodiments, the reaction of components (A) and (B) is carried out in the absence of any carrier vehicle or solvent. For example, no carrier vehicle or solvent may be combined discretely with the initial organosilicon compound (A), the acrylate compound (B), the catalyst (C) and/or the polymerization inhibitor (D) (i.e., when present). In these or other embodiments, none of components (A), (B), (C), and (D) (i.e., when present) disposed in any carrier vehicle or solvent, such that no carrier vehicle or solvent is present in the reaction mixture during the transesterification. The above notwithstanding, in certain embodiments, one of components (A) and/or (B) may be a carrier, e.g. when utilized as a fluid in an amount sufficient to carry, dissolve, or disperse any other component of the reaction mixture. In specific embodiments, the acrylate compound (B) is utilized as a carrier. Additionally, it will be appreciated that the transesterification of component (B) with component (A) results in the production of an alcohol of formula $R^2$—OH (hereinafter the "alcohol byproduct"), where $R^2$ is as defined above with respect to the acrylate compound (B). The alcohol byproduct may itself be utilized as a carrier (i.e., once produced).

In certain embodiments, the alcohol byproduct is removed from the reaction mixture once produced. As understood in the art, transesterifications are reversible reactions, such that removing the alcohol byproduct from the reaction mixture influences the reaction in terms of selectivity in favor, and/or overall yields, of the acryloxy-functional organosilicon compound (e.g. by selectively driving the equilibrium of the reaction). Typically, the alcohol byproduct is volatile, or at least more volatile than either of components (A), (B), and (C) in the reaction mixture. The removal of the alcohol byproduct may include distillation, heating, applying reduced pressure/vacuum, azeotroping with solvents, utilizing molecular sieves, etc., and combinations thereof.

In certain embodiments, the alcohol byproduct is distilled from the reaction mixture during the reaction, such that the reaction is carried out under distillation conditions. The distillation conditions typically include (i) an elevated temperature; (ii) a reduced pressure; or (iii) both an elevated temperature and reduced pressure. By elevated or reduced, it is meant as compared to room temperature and atmospheric pressure. As understood in the art, the number of trays utilized in any distillation may be optimized, and may influence the rate and/or recovery of the alcohol byproduct with respect to the distillate produced. The distillation may be continuous or batched, and may include use of a solvent (e.g. hexane, toluene, etc.), such that the distillation may be an azeotropic distillation. The distillate comprising the azeotropic solvent utilized may be reused and/or recycled after removing the alcohol byproduct therefrom (e.g. via solvent phase extraction).

In some embodiments, the reaction is carried out at the elevated temperature. The elevated temperature will be selected and controlled depending on the particular organosilicon compound (A) selected, the particular the acrylate compound (B) selected, the particular alcohol byproduct being produced (e.g. as a factor of component (B)), and combinations thereof. Accordingly, the elevated temperature will be readily selected by one of skill in the art in view of the reaction conditions and parameters selected and the description herein. The elevated temperature is typically from greater than ambient temperature to 180° C., such as from 30 to 170, alternatively from 40 to 170, alternatively from 40 to 160, alternatively from 50 to 150, alternatively from 50 to 135, alternatively from 60 to 135, alternatively from 70 to 130, alternatively from 80 to 120, ° C.

In certain embodiments, the reaction is carried out at reduced pressure. The reduced pressure will be selected and controlled depending on the particular organosilicon compound (A) selected, the particular the acrylate compound (B) selected, the particular alcohol byproduct being produced (e.g. as a factor of component (B)), and combinations thereof. Accordingly, the reduced pressure will be readily selected by one of skill in the art in view of the reaction conditions and parameters selected and the description herein. The reduced pressure is typically operated as a vacuum although any reduced pressure between vacuum and atmospheric pressure (i.e., 101.325 kPa) may be utilized. For example, the reduced pressure may be from greater than 0 to 30, alternatively from greater than 0 to 20, alternatively from greater than 0 to 15, alternatively from greater than 0 to 10, alternatively from greater than 0 to 8, alternatively from greater than 0 to 6, alternatively from greater than 0 to 5, alternatively from greater than 0 to 4, alternatively from greater than 0 to 3, alternatively from greater than 0 to 2, kPa (e.g. as measured by mmHg).

It is to be appreciated that the elevated temperature and/or reduced pressure may also differ from the ranges set forth above, especially when both elevated temperature and reduced pressure are utilized. For example, in certain embodiments, the reduced pressure is utilized in order to maintain reaction progression while utilizing a lower reaction temperature, which may lead to a decrease in the formation of undesirable byproducts (e.g. polymerization byproducts of the acrylate compound (B) and/or the acryloxy-functional organosilicon compound. Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

The time during which the reaction of components (A) and (B) to prepare the acryloxy-functional organosilicon compound is carried out is a function of scale, reaction parameters and conditions, selection of particular components, etc. In certain embodiments, the time during which the reaction is carried out is from greater than 0 to 48 hours, alternatively from 1 to 36 hours, alternatively from 2 to 24 hours, alternatively from 4 to 12 hours, after components (A) and (B) are combined in the presence of component (C).

Generally, the reaction of components (A) and (B) prepares a reaction product comprising the acryloxy-functional organosilicon compound. In particular, over the course of the reaction, the reaction mixture comprising components (A), (B), (C), and (D) (when present) comprises increasing amounts of the acryloxy-functional organosilicon compound and decreasing amounts of components (A) and (B). Once the reaction is complete (e.g. one of components (A) or (B) is consumed, no additional acryloxy-functional organosilicon compound is being prepared, etc.), the reaction mixture may be referred to as a reaction product comprising the acryloxy-functional organosilicon compound. In this fashion, the reaction product typically includes any remaining amounts of components (A), (B), (C), and (D) (when present), as well as degradation and/or reaction products thereof (e.g. materials which were not previously removed via any distillation, stripping, etc.). If the reaction is carried out in any carrier vehicle or solvent, the reaction product may also include such carrier vehicle or solvent. However, because the method is typically carried out neat (i.e., in the absence of added solvents) and performed under distillation and/or other heated conditions, this is typically not the case.

In certain embodiments, the method further comprises isolating and/or purifying the acryloxy-functional organosilicon compound from the reaction product. As used herein, isolating the acryloxy-functional organosilicon compound is typically defined as increasing the relative concentration of the acryloxy-functional organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities combined with the acryloxy-functional organosilicon compound, e.g. in the reaction product) and/or removing the acryloxy-functional organosilicon compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the acryloxy-functional organosilicon compound. It is to be appreciated that isolating may include, and thus may be referred to as, purifying the acryloxy-functional organosilicon compound. However, purifying the acryloxy-functional organosilicon compound may comprise alternative and/or additional techniques as compared to those utilized in isolating the acryloxy-functional organosilicon compound. Regardless of the particular technique(s) selected, isolation and/or purification of acryloxy-functional organosilicon compound may be performed in sequence (i.e., in line) with the reaction itself, and thus may be automated. In other instances, purification may be a stand-alone procedure to which the reaction product comprising the acryloxy-functional organosilicon compound is subjected.

In particular embodiments, isolating the acryloxy-functional organosilicon compound comprises distilling and/or stripping volatiles from the reaction product. For example, in certain embodiments, such as where component (B) is used in excess of component (A), remaining amounts of component (B) are distilled and/or stripped from the reaction mixture comprising the acryloxy-functional organosilicon compound. In these or other embodiments, isolating the acryloxy-functional organosilicon compound comprises filtering the reaction product to remove remaining amounts of the catalyst (C) and/or solids formed therefrom. In both or either case (e.g. after removing components (B) and/or (C) via stripping/distillation and/or filtration), the reaction product may be referred to as a purified reaction product comprising the acryloxy-functional organosilicon compound.

In particular embodiments, the method further comprises purifying the acryloxy-functional organosilicon compound.

Any suitable technique for purification may be utilized. In certain embodiments, purifying the acryloxy-functional organosilicon compound comprises distillation, to either remove the acryloxy-functional organosilicon compound (e.g. as a distillate) or to strip other compounds/components therefrom (i.e., leaving the acryloxy-functional organosilicon compound in the pot as a high-boiling component of the reaction mixture or purified reaction mixture. As will be appreciated by those of skill in the art, distilling the reaction product or purified reaction product to purify and/or isolation the acryloxy-functional organosilicon compound is typically carried out at an elevated temperature and a reduced pressure. The elevated temperature and reduced pressure are independently selected, e.g. based on the particular components of the reaction, the particular acryloxy-functional organosilicon compound prepared, other isolation/purification techniques utilized, etc. For example, any of the elevated temperatures and reduced pressures described herein may be utilized in purifying the acryloxy-functional organosilicon compound The acryloxy-functional organosilicon compound prepared in accordance with the method has the following general formula:

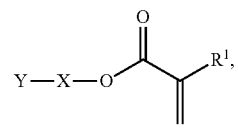

wherein Y comprises an organosilicon moiety; X is a divalent linking group; and $R^1$ is independently selected from substituted or unsubstituted hydrocarbyl groups and H. As will be understood by one of skill in the art in view of the description herein, the initial organosilicon compound (A) utilized in the method forms a portion of the acryloxy-functional organosilicon compound corresponding to the organosilicon moiety represented by the subformula Y—X—O—, and the acrylate compound (B) utilized in the method forms a portion of the acryloxy-functional organosilicon compound corresponding to the acrylate moiety of subformula —C(O)C(CH$_2$)R$^1$. As such, where formulas, structures, moieties, groups, or other such motifs are shared between the acryloxy-functional organosilicon compound and the compounds (A) and (B), the description above with respect to such shared motifs may equally describe the acryloxy-functional organosilicon compound.

For example, divalent linking group X is as described above, and thus may be linear or branched and substituted or unsubstituted. Likewise, divalent linking group X may comprise a substituted hydrocarbon, i.e., a hydrocarbon group comprising a backbone having at least one heteroatom (e.g. O, N, S, etc.). For example, in some embodiments, divalent linking group X is a hydrocarbon having a backbone comprising an ether moiety, an amino moiety (e.g. an alkylamino moiety), or both. In these or other embodiments, divalent linking group X comprises a hydrocarbon moiety having the formula —(CH$_2$)$_n$—, where subscript n is from 1 to 16.

In certain embodiments, the organosilicon moiety Y is the silane moiety having the formula (R$^3$)$_3$Si—, where, as described above, each R$^3$ is independently selected from substituted or unsubstituted hydrocarbyl groups and linear or branched siloxy groups. In these or other embodiments, the organosilicon moiety Y has the formula:

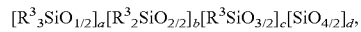

where, as described above, subscripts a, b, c, and d are each mole fractions such that a+b+c+d=1, with the proviso that a+b+c>0; and each $R^3$ is independently selected from substituted or unsubstituted hydrocarbyl groups and linear or branched siloxy groups. In this formula, one $R^3$ is bonded to, alternatively represents a covalent bond to, divalent linking group X of the acryloxy-functional organosilicon compound.

In certain embodiments, $R^1$ is H, such that the acryloxy-functional organosilicon compound may be defined as an organosilicon acrylic ester. In other embodiments, $R^1$ is selected from substituted or unsubstituted hydrocarbyl groups, such as those described above. For example, in some such embodiments, $R^1$ is an alkyl group, such that the acryloxy-functional organosilicon compound may be defined as an organosilicon alkylacrylic ester. In specific embodiments, $R^1$ is methyl, such that the acryloxy-functional organosilicon compound may be defined as an organosilicon methacrylic ester.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

The various components utilized in the Examples are set forth in Table 1 below.

TABLE 1

Compounds Utilized in Examples 1-4 and Comparative Example 1

| Compound | Description |
|---|---|
| Initial Organosilicon Compound (A1) | 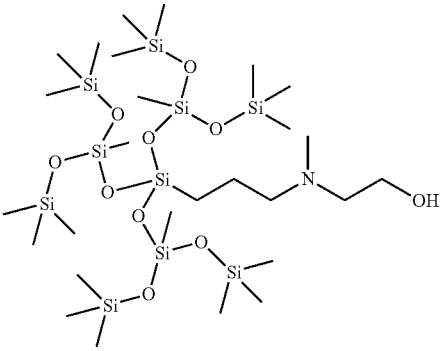 [SMILES: CN(CCO)CCC[Si](O[Si](C)(O[Si](C)(C)C)O[Si](C)(C)C)(O[Si](C)(O[Si](C)(C)C)O[Si](C)(C)C)O[Si](C)(O[Si](C)(C)C)O[Si](C)(C)C] |
| Initial Organosilicon Compound (A2) | 3-(1,1,1,3,5,5,5-heptamethyltrisiloxan-3-yl)propan-1-ol; 74.8% purity |
| Initial Organosilicon Compound (A3) | 3-(1,1,1,3,5,5,5-heptamethyltrisiloxan-3-yl)propan-1-ol; 93.2% purity |
| Initial Organosilicon Compound (A4) | 3-(1,1,1,3,5,5,5-heptamethyltrisiloxan-3-yl)propan-1-ol; 92.8% purity |
| Initial Organosilicon Compound (A5) | 3-methyl-4-(1,1,1,3,5,5,5-heptamethyltrisiloxan-3-yl)butan-1-ol |
| Acrylate Compound (B1) | Methyl Methacrylate (MMA) |
| Acrylate Compound (B2) | Methyl Acrylate (MA) |
| Catalyst (C1) | Zr(AcAc)$_4$ |
| Catalyst (C2) | LiOH |
| Inhibitor (D1) | 4-methoxyphenol (MeHQ) |
| Inhibitor (D2) | Bis(2,2,6,6-tetramethyl-4-piperidyl-1-oxyl) sebacate (TMPS); 98% purity |
| Inhibitor (D3) | 4-hydroxy-2,2,6,6-tetramethylpiperidin-1-oxyl (4-hydroxy-TEMPO; 4-HT) |

Example 1

The initial organosilicon compound (A1) (657.13 g) is loaded into a reaction vessel connected to a vacuum and fitted with two overhead receivers, a distillation column, a reboiler, and a cold trap (dry ice). The vessel is heated to 129° C., and stripped of volatiles (29.15 g; hexane/water). Vacuum is then pulled (to 10 mmHg), the vessel pot is heated to 135° C., and additional volatiles are removed (26.91 g from overheads; 21.56 g from cold trap). The inhibitor (D1) is then loaded to the system in four portions, including in the two overhead receivers (0.410 g ea.), the cold trap (0.3 g,) and to the top of the distillation column (0.50 g). A purge (7% $O_2/N_2$; 40 sccm) is then started in the reboiler fluid. The catalyst (C1) (2.9 g) and the acrylate compound (B1) (298.77 g) are then loaded into the vessel. The reactor setpoint is heated to refluxing and volatiles removed, with the overhead temperature at or below 64° C. The reaction is held for 6 hours, during which time the system is kept under vacuum to maintain reflux and a pot temperature of 103° C. and volatiles are collected (35.4 g). The reaction mixture in the pot is tested (GC) to determine conversion rate (GC; 96.3% conversion). Vacuum is then pulled to 535 mmHg, the pot heated to 103° C. with the overhead takeoff set to a reflux ratio of 40, and the reactor held for 2.5 hours. Vacuum is then pulled to 10 mmHg, the pot heated to 118° C., and the reactor maintained for 1 hour while volatiles are removed (204.31 g, with 19.03 g in the cold trap) to give the reaction product comprising the acryloxy-functional organosilicon compound (544.02 g; 100% conversion to methacryloxy ester (GC); 97.2% mass balance) as a yellow and hazy material with white powder settling out.

Example 2

The initial organosilicon compound (A1) (616 g) is loaded to the reaction vessel. The inhibitor (D1) is then loaded to the system in portions, including in the overhead receivers (0.14 g ea.), the cold trap (0.02 g,) the top of the distillation column (0.20 g), and the pot (0.5157 g). A purge (7% $O_2/N_2$) is then started in the reboiler fluid, and the acrylate compound (B1) (228.3 g) is then loaded into the pot. The reactor is then heated to reflux under vacuum (97.5° C.; 450 mmHg). The reflux ratio is held at 1:40 until the overhead temperature begins to increase, then changed to 1:99 until the overhead temperature gives pure acrylate compound (B1). Volatiles (hexane/water) are collected (111.63 g of total volatiles removed). The reactor is cooled and charged with the catalyst (C1) (3.2 g). A flow $O_2/N_2$ is started and the reactor held at 97.5° C. The reflux ratio is held at 1:40 until the OH temperature begins to climb, and then changed to 1:180. Reflux is held for 6 hours, and then set to 1:40 to remove all residual methanol. After 1 hour, the vacuum is pulled down to 10 mmHg while maintaining the pot at 97° C. while volatiles are removed (166.05 g volatiles collected), with the final reactor conditions at 97.6° C. and 238 mmHg. The reaction product comprising the acryloxy-functional organosilicon compound (565.2 g, 98.5% conversion to methacryloxy ester (GC)) is then collected as lighter yellow and hazy material with white powder settling out.

Example 3: 3-(1,1,1,3,5,5,5-heptamethyltrisiloxan-3-yl)propyl methacrylate (MD'M-ALMA)

The initial organosilicon compound (A2) (150.23 g), acrylate compound (B1) (121.34 g), inhibitor (D1) (0.12 g), and inhibitor (D2) (0.2 g) are loaded into a 500-mL reaction vessel equipped with a stir bar, heating mantle, thermocouple, temperature controller with over temperature protection, overhead temperature monitor, gas inlet tube, and a 12-in height distillation column/distillation head packed with 316 stainless steel 0.16 inch Pro-Pak® packing, condenser, and a magnetic reflux splitter/controller. Additional portions of inhibitor (D1) are loaded to the top of the condenser (0.7 g) and into receiver #1 (0.2 g). A purge (6% $O_2/N_2$) is then started in the reboiler fluid. The catalyst (01) (2.08 g, 0.01 mol eq.) is added to the reaction, and the reaction mixture is heated to and held at 115° C. until distillates stop. Vacuum is then pulled to 0.5 mmHg with heat until distillates stop and the overhead temperature decreases from 37.7° C. to 27° C. The vacuum and the $O_2/N_2$ purge are stopped and the reaction mixture is cooled. The reaction mixture comprising the acryloxy-functional organosilicon compound is then analyzed via GC (Agilent 7200 GC-QTOF, Phenomenex ZB-5M Splus 30 m×0.25 mm×0.25 μm column, 250° C. injector and source temperature, 1.2 mL/min flow rate, 50:1 split ratio, 0.1 μL injection volume, first hold at 40° C. for 4 min then step up at 10° C./min to 320° C., hold at 320° C. for 5 min). GC analysis shows 100% conversion of the initial organosilicon compound and 79.3% in-pot yield of the desired product.

The distillates are removed from receiver #1 ("Light Cut"; 68.14 g). Additional portions of inhibitor (D1) are added to the reaction vessel (0.30 g), top of the condenser (0.71 g) and receiver #1 (0.23 g). The reaction mixture is then heated to 140° C. under vacuum (1 torr), and held at a reflux ratio of 3:1. Volatiles ("Mixed Cut") are collected when the overhead temperature reaches 52° C., until the overhead temperature stabilizes at ~102° C. for 10 min. Collection is switched to receiver #2, volatile collection is started ("Product Cut"), and the reflux ratio is changed to 2:1 ratio after 1 hour of collection. Collection of the Product Cut is stopped when distillates stop and the overhead temperature decreases. The Product Cut (64.49 g, clear and light yellow liquid) contains the desired acryloxy-functional organosilicon compound (5.1% purity; 44% isolated yield).

Example 4: 3-(1,1,1,3,5,5,5-heptamethyltrisiloxan-3-yl)propyl acrylate

The initial organosilicon compound (A3) (10.02 g), acrylate compound (B2) (9.0 g), inhibitor (D1) (0.008 g), and inhibitor (D2) (0.02 g) are loaded into a 100-mL reaction vessel equipped with a stir bar, heating mantle, thermocouple, temperature controller with over temperature protection, and fitted with a Vigreux distillation column that is connected to a condenser and a receiver. An additional portion of inhibitor (D1) (0.15 g) is loaded to the top of the condenser. The catalyst (C1) (0.18 g. 0.01 eq.) is added to the reaction vessel. The reaction temperature is increased to 88° C. and volatiles are collected (2.4 mL total). The reaction temperature is further increased to 90° C. and additional volatiles are collected (3.5 mL total). The reaction is held at 90° C. until GC analysis (same method as in Example 3) showed no change in alcohol conversion (1 hour). The reaction temperature is then raised to 100° C. for 1 hour, and then to 110° C. for 1 hour while volatiles are collected (3.8 mL total; 3.52 g). The final reaction product mixture (12.93 g) is a clear and light yellow liquid. GC analysis shows 97.5% conversion of the initial organosilicon compound.

Example 5: 3-methyl-4-(1,1,1,3,5,5,5-heptamethyl-trisiloxan-3-yl)butyl acrylate A 1000 ml 4-neck round bottom flask, fitted with overhead stirrer, temperature controller with over temperature protection, overhead temperature monitor, gas inlet tube, and 10-plate Oldershaw distillation column/distillation head with an automated reflux splitter/controller, is charged with the initial silicone compound (A5) (155.3 g; 0.5 mol), acrylate compound (B1) (152.4 g; 1.5 mol; 3:1 molar ratio (B1):(A5)) and catalyst (01) (3.34 g; 0.0068 mol). The reaction mixture is charged with inhibitors (D1) and (D3) to achieve 1338 ppm and 288 ppm in the mixture, respectively. A gas purge (8% $O_2$ in $N_2$) is started, and the stirrer turned on. A sample of pot contents is taken for NMR analysis. The flask pressure was reduced to 550 mm Hg and the pot contents heated slowly to between 96-106° C. and refluxed for about 1 hour. The vapor temperature stabilizes between 58-56° C. MMA-methanol azeotrope is distilled off at a vapor temperature of 56° C. using a reflux ratio of 70:30. The distillation is continued until the vapor temperature reaches 65° C. Heating is turned off, the pot contents are allowed to cool down to 70° C., and a sample is taken for NMR analysis. Excess MMA is removed via distillation at a pot temperature of 65° C. and 150 mmHg vacuum. The final product is an amber colored low viscosity liquid (product weight was 185 g; 98% yield). NMR analysis of the final monomer indicated the presence of 1% of MMA and the

Comparative Example 1

The initial organosilicon compound (A4) (10.08 g), acrylate compound (B1) (100 g), inhibitor (D1) (0.008 g), and inhibitor (D2) (0.02 g) are loaded into a 100-mL reaction vessel equipped with a stir bar, heating mantle, thermocouple, temperature controller with over temperature protection, and fitted with a Vigreux distillation column that is connected to a condenser and a receiver. An additional portion of inhibitor (D1) (0.15 g) is loaded to the top of the condenser. The catalyst (C2) (0.015 g; 0.02 mol eq.) is added to the reaction vessel, and the reaction is heated to 90° C. After 3 hours, GC analysis (same method as in Example 3) shows 22.3% conversion of A5, and white precipitates started to form in the reaction. A second portion of the catalyst (C2) (0.023 g) is added. After 55 min, GC analysis shows 53.7% conversion of A5, which remains unchanged for an addition 1 hour. A second portion of the catalyst (C2) (0.028 g) is added to increase A5 conversion (65.2% (GC)). Additional portions of the catalyst (C2) are then added (0.02-0.03 g/ea.) within an interval of 1-2 hours to increase the conversion of A5 (0.324 g catalyst (C2) added total; 0.41 mol eq.), and the reaction temperature is held at 115° C. for two hours. No volatiles are collected. The reaction product mixture (12.1 g) is collected as an opaque liquid containing white precipitates. GC analysis shows 66.8% in-pot yield of the final product and 96% conversion of the initial organosilicon compound.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

The invention claimed is:

1. A method of preparing an acryloxy-functional organosilicon compound, said method comprising:
   reacting (A) an initial organosilicon compound having one alcohol group and (B) an acrylate compound in the presence of (C) a catalyst having the formula M[RC(O)CHC(O)R]$_4$, where M is a group IV transition metal and each R is an independently selected substituted or unsubstituted hydrocarbyl group, thereby preparing the acryloxy-functional organosilicon compound;
   wherein the initial organosilicon compound (A) is monohydroxy functional and comprises a branched siloxy group.

2. The method of claim 1, wherein in the catalyst (C): (i) M is Zr or Hf; (ii) each R is independently $CH_3$ or $CH_2CH_3$; or (iii) both (i) and (ii).

3. The method of claim 1, wherein the initial organosilicon compound (A) has the following formula:

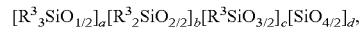

where each $R^3$ is independently selected from substituted or unsubstituted hydrocarbyl groups and linear or branched siloxy groups, with the proviso that one $R^3$ comprises an alcohol group; and subscripts a, b, c, and d are each mole fractions such that a+b+c+d=1, with the proviso that a+b+c>0.

4. The method of claim 1, wherein: (i) the initial organosilicon compound (A) and the acrylate compound (B) are reacted in a molar ratio of from 0.1 to 20 (A):(B); (ii) the initial organosilicon compound (A) and the acrylate compound (B) are reacted at a temperature of from 25 to 180° C., optionally from 80 to 120° C.; (iii) the catalyst (C) is utilized in the reaction in an amount of from 0.05 to 10 mole % based on the combined amounts of components (A), (B), and (C); or (iv) any combination of (i) to (iii).

5. The method of claim 1, wherein the acrylate compound (B) has the following formula:

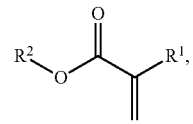

where $R^1$ is selected from substituted or unsubstituted hydrocarbyl groups and H; and $R_2$ is a substituted or unsubstituted hydrocarbyl group having from 1 to 4 carbon atoms.

6. The method of claim 5, wherein in the acrylate compound (B): (i) $R^1$ is H or $CH_3$; (ii) $R^2$ is $CH_3$, $CH_2CH_3$, or $CH_2(CH_2)_2CH_3$; or (iii) both (i) and (ii).

7. The method of claim 1, wherein the initial organosilicon compound (A) has the following formula:

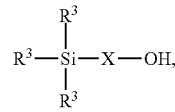

where X is a divalent linking group; and each $R^3$ is independently selected from substituted or unsubstituted hydrocarbyl groups and linear or branched siloxy groups.

8. The method of claim 7, wherein the divalent linking group X comprises: (i) a substituted or unsubstituted hydrocarbon group having from 1 to 16 carbon atoms; (ii) a hydrocarbon moiety having the formula —(CH$_2$)$_n$—, where subscript n is from 1 to 16; (iii) an ether moiety; (iv) an alkylamino moiety; or (v) any combination of (i) to (iv).

9. The method of claim 1, wherein the initial organosilicon compound (A) and the acrylate compound (B) are reacted in the presence of (D) a polymerization inhibitor.

10. The method of claim 9, wherein the polymerization inhibitor (D) comprises: (i) a radical scavenger; (ii) an antioxidant; (iii) a light stabilizer; (iv) a UV-absorber; or (v) any combination of (i) to (iv).

11. The method of claim 1, wherein reacting the initial organosilicon compound (A) and the acrylate compound (B) forms a reaction product comprising the acryloxy-functional organosilicon compound; and wherein the method further comprises isolating the acryloxy-functional organosilicon compound from the reaction product.

12. The method of claim 11, wherein the reaction product further comprises an organic alcohol formed by reacting the initial organosilicon compound (A) and the acrylate compound (B); and wherein the method further comprises removing the organic alcohol from the reaction product.

13. An acryloxy-functional organosilicon compound prepared in accordance with the method of claim 1.

14. The acryloxy-functional organosilicon compound of claim 13, having the following formula:

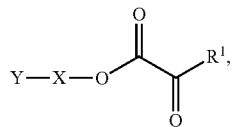

wherein Y comprises an organosilicon moiety; X is a divalent linking group; and R$^1$ is independently selected from substituted or unsubstituted hydrocarbyl groups and H.

15. The acryloxy-functional organosilicon compound of claim 14, wherein the organosilicon moiety Y is a silane moiety having the formula (R$^3$)$_3$Si—, where each R$^3$ is independently selected from substituted or unsubstituted hydrocarbyl groups and linear or branched siloxy groups.

16. The acryloxy-functional organosilicon compound of claim 14, wherein the organosilicon moiety Y is an organopolysiloxane having the formula:

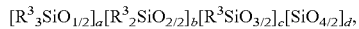

where each R$^3$ is independently selected from substituted or unsubstituted hydrocarbyl groups and linear or branched siloxy groups, with the proviso that one R$^3$ is a silicon-bonded divalent linking group; and subscripts a, b, c, and d are each mole fractions such that a+b+c+d=1, with the proviso that a+b+c>0.

17. The acryloxy-functional organosilicon compound of claim 14, wherein: (i) divalent linking group X is a substituted or unsubstituted hydrocarbon group having from 1 to 16 carbon atoms; (ii) R$^1$ is H or CH$_3$; or (iii) both (i) and (ii).

18. The acryloxy-functional organosilicon compound of claim 14, wherein the divalent linking group X comprises: (i) a substituted or unsubstituted hydrocarbon group having from 1 to 16 carbon atoms; (ii) a hydrocarbon moiety having the formula —(CH$_2$)$_n$—, where subscript n is from 1 to 16; (iii) an ether moiety; (iv) an alkylamino moiety; or (v) any combination of (i) to (iv).

* * * * *